(12) United States Patent
Ricketts et al.

(10) Patent No.: US 11,497,165 B2
(45) Date of Patent: Nov. 15, 2022

(54) CONTROLLED LATERAL BELT REVERSE FOR DRAPER HEAD OF AGRICULTURAL COMBINE

(71) Applicant: CNH Industrial America LLC, New Holland, PA (US)

(72) Inventors: Jonathan Ricketts, Coal Valley, IL (US); Herbert Farley, Elizabethtown, PA (US); Jeffrey Trowbridge, Stevens, PA (US)

(73) Assignee: CNH Industrial America LLC, New Holland, PA (US)

(*) Notice: Subject to any disclaimer, the term of this patent is extended or adjusted under 35 U.S.C. 154(b) by 491 days.

(21) Appl. No.: 16/662,345

(22) Filed: Oct. 24, 2019

(65) Prior Publication Data

US 2021/0120738 A1    Apr. 29, 2021

(51) Int. Cl.
*A01D 41/127* (2006.01)
*A01D 61/00* (2006.01)
(Continued)

(52) U.S. Cl.
CPC ..... *A01D 41/1276* (2013.01); *A01D 41/1274* (2013.01); *A01D 57/20* (2013.01); *A01D 61/008* (2013.01); *A01B 63/1013* (2013.01); *A01D 75/182* (2013.01); *F02M 63/005* (2013.01); *F02M 63/0054* (2013.01); *F02M 69/462* (2013.01); *F16K 15/044* (2013.01); *F16K 17/0406* (2013.01)

(58) Field of Classification Search
CPC . F16K 17/0406; F16K 15/044; F02M 69/462; F02M 63/0054; F02M 63/005; A01D 61/008; A01D 41/1276; A01D 75/182; A01D 57/20; A01D 41/142; A01D 41/1274; A01B 63/1013
See application file for complete search history.

(56) References Cited

U.S. PATENT DOCUMENTS 3,214,002 A * 10/1965 Kirkpatrick ............ A01D 57/20
56/192
4,218,864 A    8/1980 Allemeersch et al.
(Continued)

OTHER PUBLICATIONS

International Search Report and Written Opinion for Application No. PCT/US2020/056969 dated Feb. 9, 2021 (11 pages).

*Primary Examiner* — Arpad Fabian-Kovacs
(74) *Attorney, Agent, or Firm* — Peter Zacharias; Patrick Sheldrake

(57) ABSTRACT

A system and method for reversing a movement direction of a laterally extending conveyor of a draper header of an agricultural machine. The system includes a fluid line for delivering fluid to a motor that drives the laterally extending conveyor. A directional flow control valve is connected to the fluid line and is movable between a first state in which the directional flow control valve is configured to deliver the fluid to the motor in a first fluid direction to cause the motor to move the laterally extending conveyor in a first movement direction, and a second state in which the directional flow control valve is configured to deliver the fluid to the motor in a second fluid direction that is different from the first fluid direction to cause the motor to move the laterally extending conveyor in a second movement direction that is opposite to the first movement direction.

13 Claims, 6 Drawing Sheets

(51) Int. Cl.
*A01D 57/20* (2006.01)
*A01D 75/18* (2006.01)
*A01B 63/10* (2006.01)
*F02M 63/00* (2006.01)
*F16K 17/04* (2006.01)
*F02M 69/46* (2006.01)
*F16K 15/04* (2006.01)

(56) References Cited

U.S. PATENT DOCUMENTS

| | | | | |
|---|---|---|---|---|
| 4,429,517 A * | 2/1984 | Lohrentz | ............ | A01D 57/20 56/192 |
| 4,519,190 A * | 5/1985 | Blakeslee | ............ | A01D 57/20 56/192 |
| 4,522,018 A | 6/1985 | Blakeslee | | |
| 4,663,919 A | 5/1987 | Stroh et al. | | |
| 5,086,613 A | 2/1992 | Fox et al. | | |
| 5,430,997 A * | 7/1995 | O'Halloran | ............ | A01D 34/80 56/10.2 H |
| 5,778,644 A | 7/1998 | Keller et al. | | |
| 5,791,128 A * | 8/1998 | Rogalsky | ............ | A01D 41/142 60/484 |
| 6,651,412 B1 | 11/2003 | Sierk et al. | | |
| 7,007,708 B2 * | 3/2006 | Burke | ............ | F02M 63/0054 137/12 |
| 7,467,505 B2 * | 12/2008 | MacGregor | ............ | A01B 71/06 56/11.9 |
| 8,001,751 B2 * | 8/2011 | Ehrhart | ............ | A01B 63/1013 56/11.9 |
| 8,186,136 B2 | 5/2012 | Eick et al. | | |
| 8,833,044 B2 * | 9/2014 | Hoffman | ............ | A01D 43/06 56/10.6 |
| 9,144,197 B2 | 9/2015 | Gahres | | |
| 9,320,198 B2 * | 4/2016 | Trowbridge | ............ | A01D 75/182 |
| 9,894,834 B2 | 2/2018 | van Vooren et al. | | |
| 10,028,437 B2 | 7/2018 | Bomleny et al. | | |
| 10,412,887 B2 * | 9/2019 | Füchtling | ............ | A01D 61/02 |
| 2010/0251682 A1 | 10/2010 | Eick et al. | | |
| 2016/0360699 A1 | 12/2016 | Allochis | | |

* cited by examiner

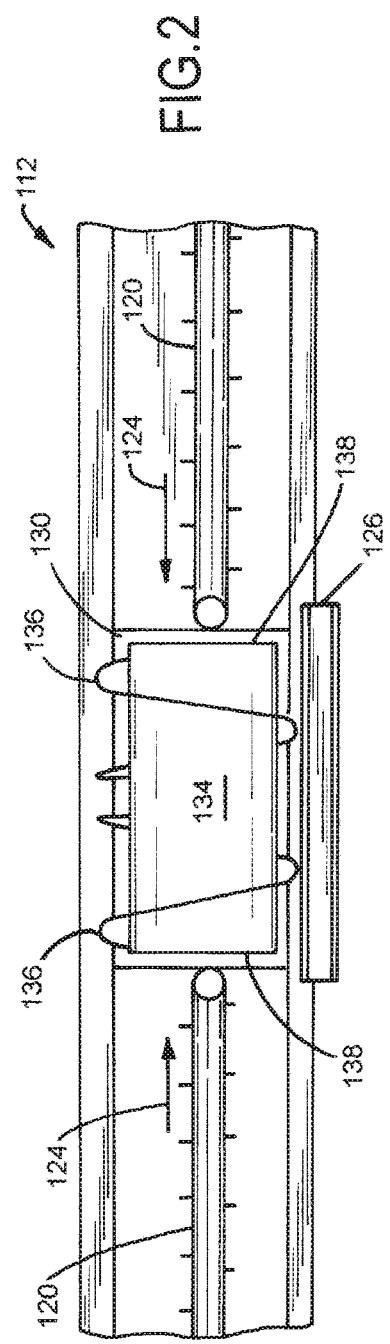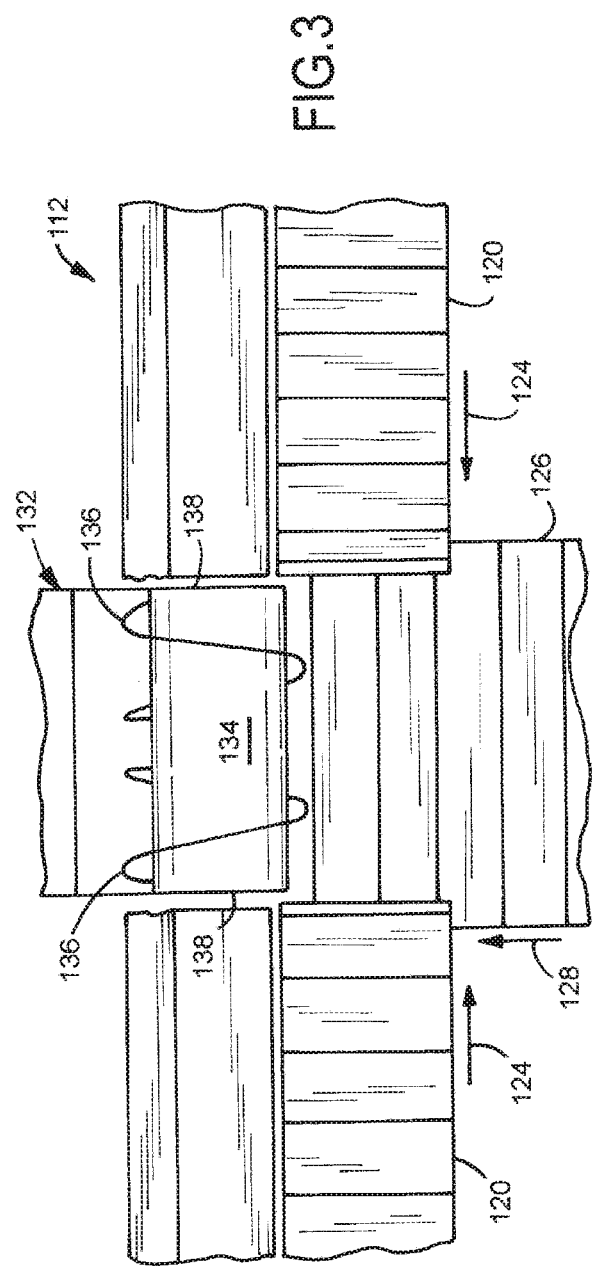

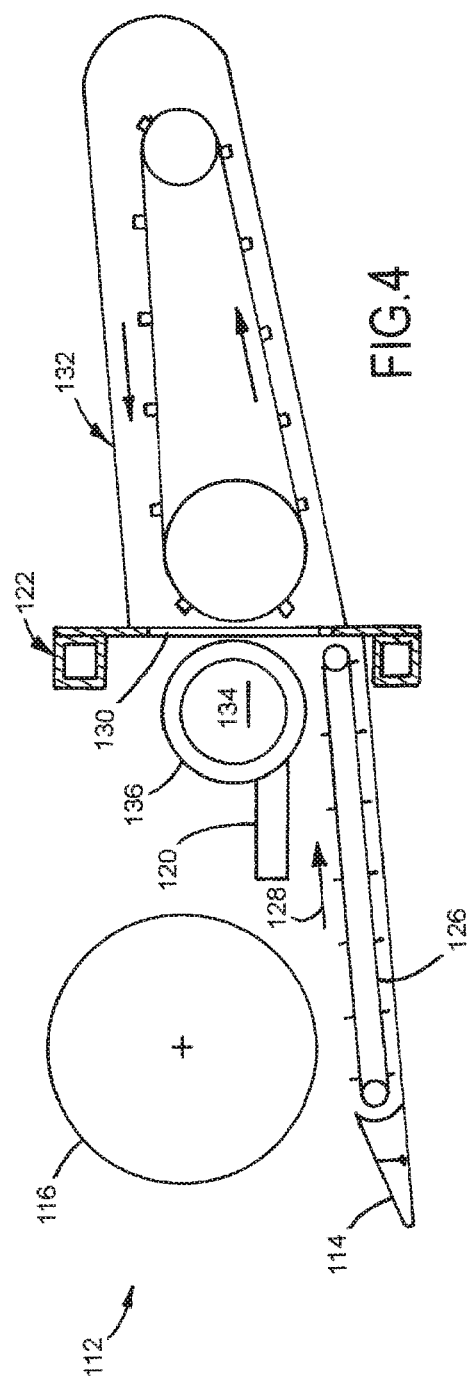

CONTROLLED LATERAL BELT REVERSE FOR DRAPER HEAD OF AGRICULTURAL COMBINE

FIELD OF THE INVENTION

The present invention relates generally to a draper header of an agricultural machine, such as a combine, and more particularly, to a system and method for reversing lateral belts of the header.

BACKGROUND OF THE INVENTION

As is described in U.S. Pat. No. 9,144,197 to CNH America LLC, which is incorporated by reference herein in its entirety and for all purposes, a typical header of an agricultural combine includes one or more cutters, e.g., cutter bars with reciprocating knives, which cut the crop material that is harvested from the field. Once the crop material is cut, a conveyor system, which is positioned rearwardly of the cutter(s), transports the crop material to the feeder housing. Modern headers generally have cutters and attachments which are specifically optimized to harvest a particular kind of crop material. For instance, the header may include a rotating reel with tines or the like to sweep the crop material towards the cutter(s). Alternatively, the header may include snouts and row units instead of a rotating reel and cutter bar(s).

A draper header is typically used to harvest fluffy or bushy crop material such as soy beans or canola. A draper header generally includes a conveyor that is in the form of one or more flat belts, known as draper belts, to convey the crop material to the feeder housing. Typically, a draper header may include two lateral draper belts that convey the crop material longitudinally inward and a center feed belt that conveys the crop material into the feeder housing. Each draper belt may be wrapped around rollers, for example various combinations of drive rollers and idler rollers. The draper belts may include cleats extending transversely across the full width of the header, which contact the crop material to help facilitate its transportation into the feeder housing.

It has been found that crop material has a tendency to get carried around the inner most ends of the lateral draper belts, and/or accumulate around the belt rollers or other areas. Such accumulation of crop material can hinder movement of the draper belts. It has also been found that momentarily reversing the direction of the draper belts will dislodge the accumulated crop material.

Thus, it would be advantageous to provide a convenient and automated system for an operator of a combine to momentarily reverse the direction of the draper belts without necessitating the operator to leave the cab of the combine.

SUMMARY OF THE INVENTION

According to one aspect of the invention, a system for reversing a movement direction of a laterally extending conveyor of a draper header of an agricultural machine is provided. The system comprises a fluid line for delivering fluid to a motor that is configured to drive the laterally extending conveyor. A directional flow control valve is connected to the fluid line and movable between a first state in which the directional flow control valve is configured to deliver the fluid to the motor in a first fluid direction to cause the motor to move the laterally extending conveyor in a first movement direction, and a second state in which the directional flow control valve is configured to deliver the fluid to the motor in a second fluid direction that is different from the first fluid direction to cause the motor to move the laterally extending conveyor in a second movement direction that is opposite to the first movement direction. The directional flow control valve is maintained in the first state during a harvesting operation, and the directional flow control valve is maintained in the second state during an operation to dislodge crop material from the laterally extending conveyor.

According to another aspect of the invention, a method of reversing a movement direction of a laterally extending conveyor of a draper header of an agricultural machine is provided. The method includes delivering fluid through a fluid line to a motor in a first fluid direction such that the motor drives the laterally extending conveyor in a first movement direction during a harvesting operation, while a directional flow control valve connected to the fluid line is maintained in a first state; and switching the directional flow control valve to a second state to deliver the fluid to the motor in a second fluid direction that is different from the first fluid direction thereby causing the motor to move the laterally extending conveyor in a second movement direction that is opposite to the first movement direction for dislodging crop material wedged in the laterally extending conveyor.

According to yet another aspect of the invention, a system for reversing the direction of a laterally extending conveyor of a draper header of an agricultural machine comprises a motor that is configured to move the laterally extending conveyor in a harvesting direction, and means for causing the motor to move the laterally extending conveyor in a direction that is opposite to the harvesting direction for a pre-determined period of time.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2 is a partial schematic front elevation view of a header for an agricultural harvester.

FIG. 3 is a partial schematic top plan view of the header of FIG. 2.

FIG. 4 is a schematic elevational cross-section view taken along a centerline of the header.

DETAILED DESCRIPTION OF THE INVENTION

Figure 1:
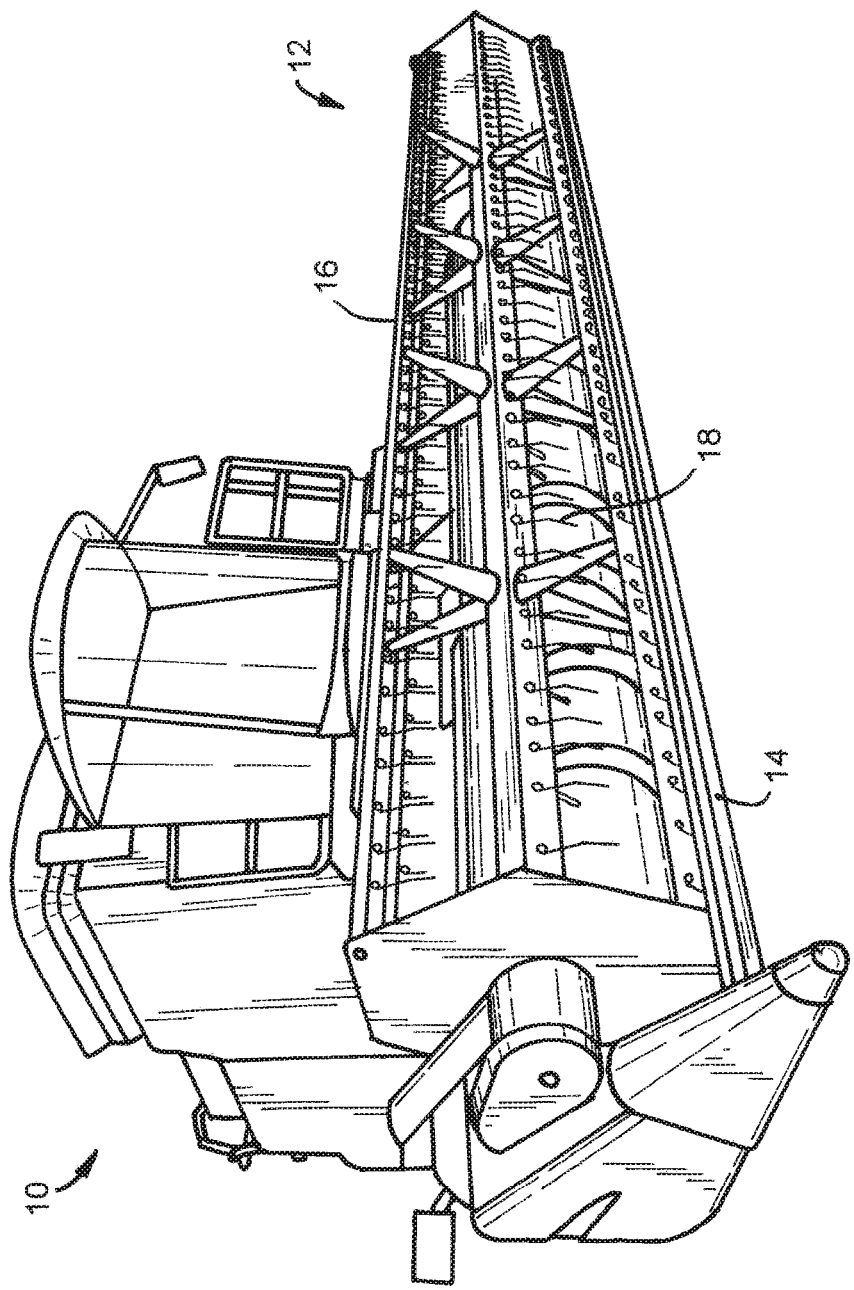
FIG. 1 is a perspective view of an agricultural harvester including a header.

Corresponding reference characters indicate corresponding parts throughout the several views. The exemplification set out herein illustrates an embodiment of the invention, in one form, and such exemplification is not to be construed as limiting the scope of the invention in any manner.

The terms "forward", "rearward", "left" and "right", when used in connection with the agricultural combine and/or components thereof are usually determined with reference to the direction of forward operative travel of the combine, but again, they should not be construed as limiting. The terms "longitudinal" and "transverse" are determined with reference to the fore-and-aft direction of the combine and are equally not to be construed as limiting.

Referring now to the drawings, as is described in U.S. Pat. No. 9,144,197, FIG. 1 illustrates an agricultural harvester applicable to the subject application in the form of a combine harvester 10 to which is attached a draper header 12. The draper header 12 has a crop cutter or knife assembly 14 arranged close the ground. The knife assembly can include a stationary blade and a reciprocating blade which together act as shears that cut the crop near the ground. A harvesting reel 16 having tines 18 rotates about a horizontal axis adjacent to the knife assembly 14 to gather the cut crop and feed it into unillustrated processing machinery of the harvester.

Turning to FIGS. 2 through 4, there are shown several views of another draper header 112. The header 112 includes a crop cutter and harvesting reel 116 (FIG. 4) followed rearwardly by a crop or grain conveyor system. The harvesting reel 116 gathers the crop cut by the crop cutter 114 and delivers the cut crop to a conveyor system. The conveyor system typically includes a header conveyor constructed as a pair of opposed, laterally extending conveyors 120 which extend from the lateral ends of the header frame or chassis 122 (shown in cross-section in FIG. 4) toward a generally central region of the chassis. As indicated by arrows 124 of FIGS. 2 and 3, cut crop is delivered by conveyors 120 toward a centrally located infeed conveyor 126. Infeed conveyor 126 extends substantially perpendicular to conveyors 120 and is driven by conventional belt drive means (not illustrated) to move crop in the direction of arrows 128 toward an outlet 130 (FIGS. 2 and 4) which leads to a feederhouse 132.

As seen in FIGS. 2 through 4, before reaching outlet 130, the cut crop first encounters a centrally located rotatable infeed auger 134 which impels the crop or grain through the outlet 130. More specifically, the cut crop is engaged by the helical vanes or flights 136 of the infeed auger 134 and is pushed thereby through outlet 130.

It has been observed that conventional conveyor systems suffer certain disadvantages. As noted above, it has been found that crop material has a tendency to get carried around the inner most ends of the laterally extending conveyors 120, and/or accumulate around the belt rollers of those conveyors or other areas. Such accumulation of crop material can hinder movement of the laterally extending conveyors 120. It has also been found that momentarily reversing the direction of the laterally extending conveyors 120 will dislodge the accumulated crop material.

Figure 5:
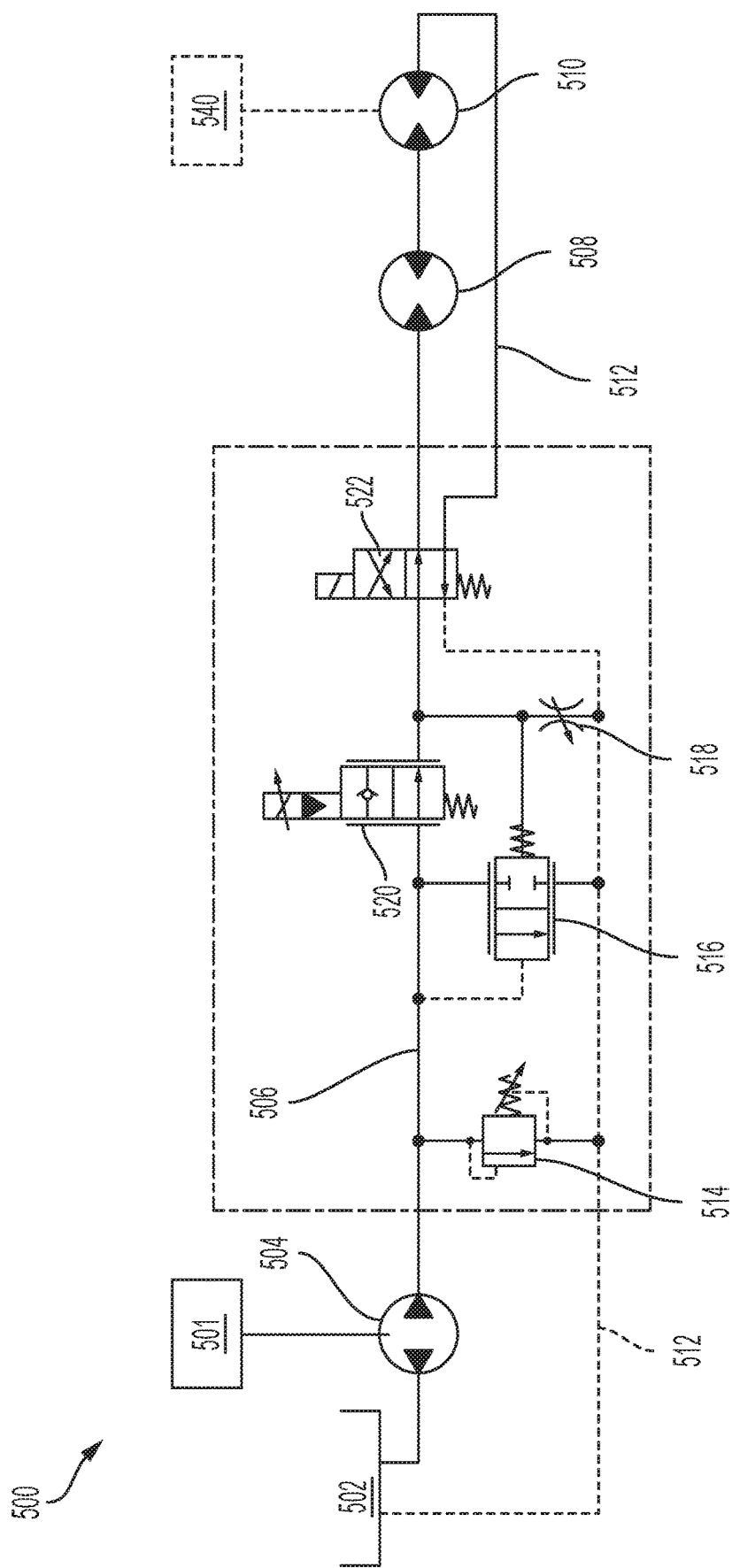
FIG. 5 is a hydraulic schematic of a system for reversing the direction of the lateral draper belts of the header of FIG. 2.

FIG. 5 is a hydraulic schematic of a system 500 for reversing the direction of the laterally extending conveyors 120. The system 500 comprises a reservoir 502 for containing hydraulic fluid (or other fluid). A gear pump 504, which is controlled by a controller 501, is provided for drawing fluid from the reservoir 502 and directing the fluid through a forward path fluid line 506 toward two side draper motors 508 and 510. The side draper motor 508 is configured to move one of the conveyors 120, and the side draper motor 510 is configured to move the other conveyor 120. The motors 508 and 510 are fluidly connected together in series.

A return path fluid line 512 is connected to a fluid port of the motor 510 for returning fluid to the reservoir 502. A relief valve 514 is fluidly connected between the fluid lines 506 and 512 for relieving excess pressure in the forward path fluid line 506. The fluid lines 506 and 512 may also be referred to herein as fluid conduits. A pressure compensated fluid valve 516 is also fluidly connected between the fluid lines 506 and 512. A manual bypass 518 permits an operator to deactivate the side conveyors 120 for service or repair of the header.

It is noted that the system 500 is shown in a harvesting mode in FIG. 5, wherein fluid is freely delivered by the pump 504 to side draper motors 508 and 510, such that the motors 508 and 510 rotate the conveyors 120 to deliver crop material to infeed conveyor 126.

A proportional flow control valve 520 is fluidly connected to the fluid line 506 at a location downstream of the pump 504. The valve 520 is movable between two states. In the open state shown in FIG. 5, the valve 520 permits the passage of fluid through the line 506 and toward the motor 508. In the open state of the valve 520, the orifice size of the valve 520 of FIG. 5 may be adjusted to control the flow rate of the fluid through the valve 520. Specifically, the duty cycle of the valve 520 is adjustable by the controller 501 to change the pressure and/or flow rate of the fluid delivered downstream of the valve 520 (i.e., in the direction of the motors 508 and 510). Thus, the setting of the valve 520 dictates the flow rate of the fluid to the motors 508 and 510. In the closed state (not shown in FIG. 5), the valve 520 operates as a check valve to prevent the passage of fluid in the downstream direction from the pump 504 to the motor 508. Together, the valves 520 and 516 are configured to provide constant flow to the motors 508 and 510 regardless of pressure fluctuations in the system 500.

A directional flow control valve 522 is fluidly connected to both fluid lines 506 and 512. The valve 522 is connected to the fluid line 506 at a location downstream of the valve 520. The valve 522 is configured to drive the motors 508 and 510 in either a forward rotational direction or a reverse rotational direction. More particularly, the valve 522 is movable between two states by the controller 501. In the normal state shown in FIG. 5, which corresponds to the harvesting mode of the combine, the valve 522 permits the passage of fluid from the valve 520 and toward the motor 508, and also permits the passage of fluid from the motor 510 back to the reservoir 502. In the reverse state (not shown in FIG. 5, but is denoted by the crossing arrows in the valve 522), the valve 522 directs the fluid from the valve 520 to the motor 510, and the valve 522 also directs the fluid from the motor 508 back to the reservoir 502. The motors 508 and 510 are normally driven in a forward direction during a harvesting operation. Driving the motors 508 and 510 in the reverse rotational direction causes the conveyors 120 to move in the opposite direction for dislodging the accumulated crop material on the conveyors 120.

It is noted that the valves 520 and 522 are biased by springs to a normally-open position, as shown in FIG. 5. The valves 520 and 522 may also be controlled by the controller 501. Thus, in the event of an electrical failure of the system 500, the combine may continue to be used in a harvesting mode.

Figure 6:
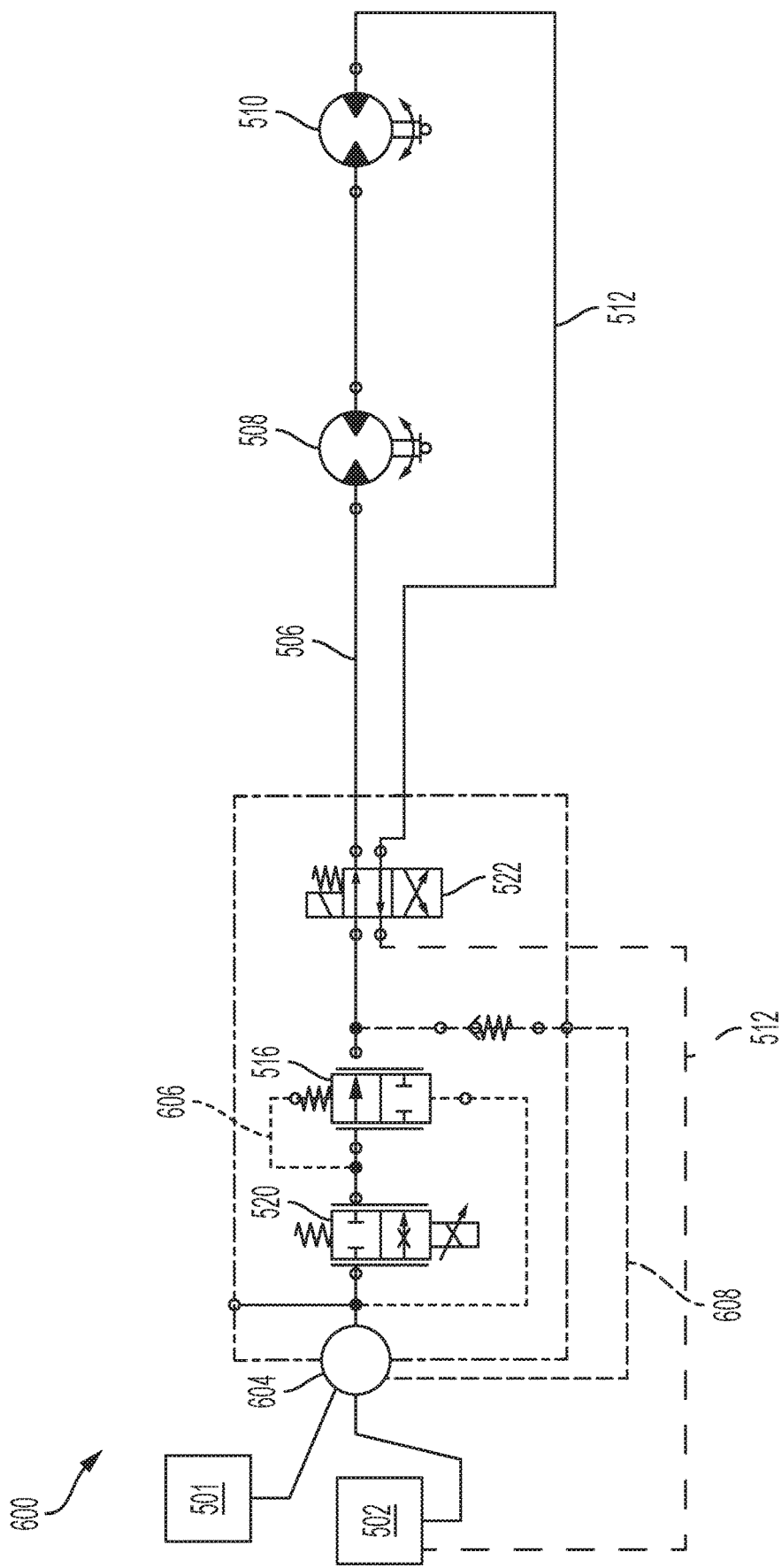
FIG. 6 is a hydraulic schematic of another system for reversing the direction of the lateral draper belts of the header of FIG. 2.

FIG. 6 depicts a hydraulic schematic of another system 600 for reversing the direction of the lateral draper belts of the header of FIG. 2. The system 600 is substantially similar to the system 500 and the primary differences therebetween will be described hereinafter.

Unlike the gear pump 504, the pump 604 of the system 600 is a piston pump. The manual bypass 518 and the relief valve 514 are omitted from system 600 due at least in part to the different pump styles. The valve 520 is normally closed, and opens upon activation of the system 600. A conduit 606 connects the downstream side of valve 520 with the input of the valve 516. Thus, the pressure at the downstream side of valve 520 is communicated to the valve 516 thereby at least partially dictating the open/closed position of the valve 516. The valves 520 and 516 together are configured to provide constant flow to the motors 508 and 510 regardless of pressure fluctuations in the system 500, as noted above. The conduit 608 connects the forward fluid path line 506 with the pump 604, and the pressure communicated to the pump 604 via conduit 608 dictates the position of the swash plate inside of the pump 604, which affects the flow rate of the pump.

Figure 7:
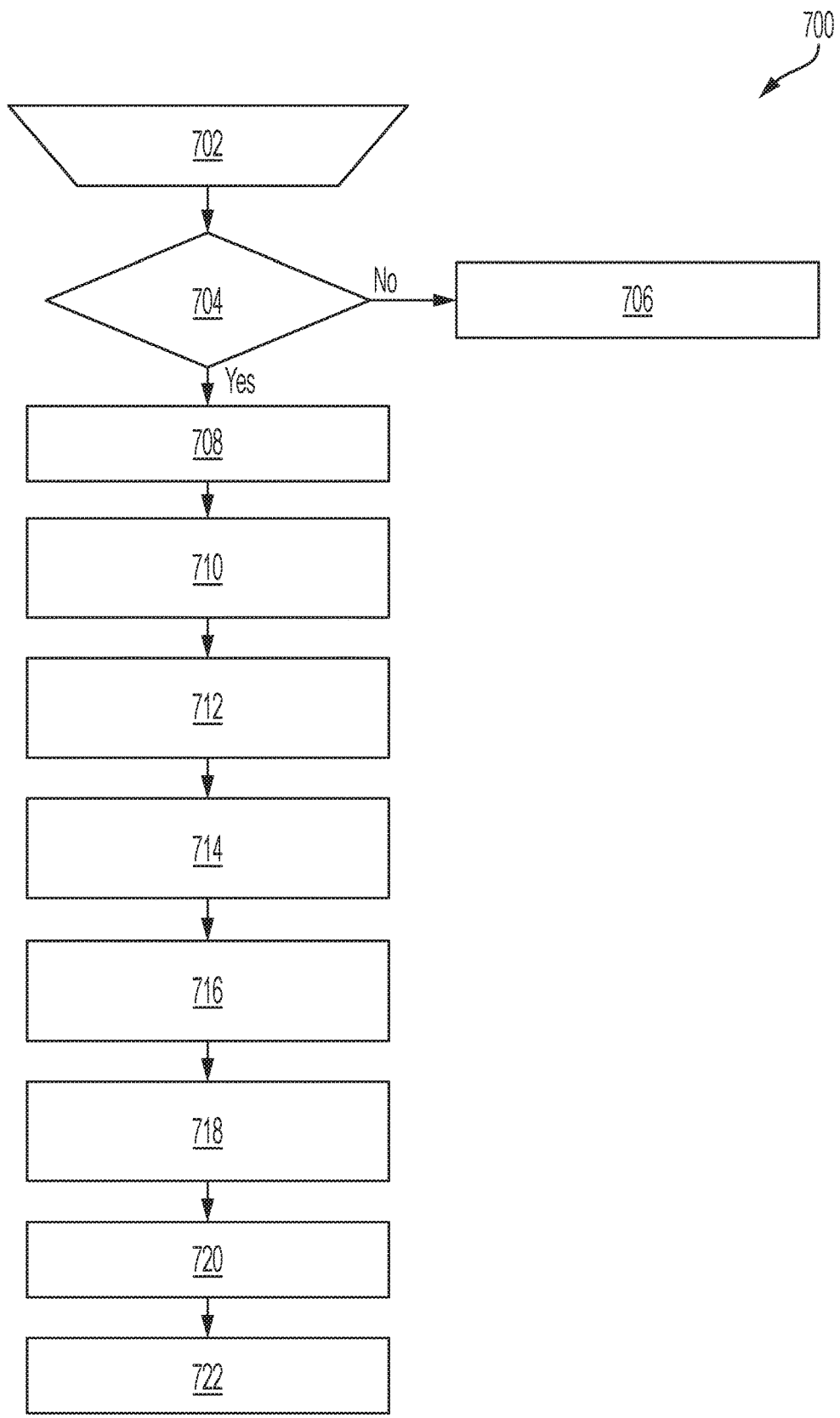
FIG. 7 is a block diagram illustrating an exemplary method for operating the systems of FIGS. 5 and 6.

FIG. 7 is a flow chart illustrating an exemplary method 700 for operating the systems 500 and 600 for reversing the direction of the laterally extending conveyors 120. At input step 702, the operator of the combine instructs the combine to momentarily reverse the direction of the conveyors 120. This may be accomplished by either depressing a button, or entering a command into a graphical user interface (GUI) of the combine, for example. Alternatively, this step may be performed automatically by the controller 501 in a headland mode of the combine (described later). At decision step 704, the controller 501 (or processor associated with the controller 501) determines whether the combine is currently being operated in a harvesting mode. If the combine is not currently being operated in a harvesting mode, then the controller 501 transmits an audible or visual message on a display of the combine alerting the operator of the combine that the reverse feature is not available unless the combine is in a harvest mode, as indicated at step 706.

Alternatively, as indicated at step 708, if the combine is currently being operated in a harvesting mode, then the controller 501 first determines the speed of the motors 508 and 510 during the harvesting mode by recording the duty cycle of the proportional valve 520. The recorded duty cycle, which corresponds to the speed of the motors 508 and 510, will be used later in the method at step 720. Thereafter, the controller 501 decreases the flow of fluid to the draper motors 508 and 510 by adjusting the duty cycle of the proportional valve 520 to reduce the speed of the motors 508 and 510. The pump speed may be reduced until the motors 508 and 510 are either stopped or below a predetermined minimum threshold speed. Step 708 is performed to prevent possible damage to the motors 508 and 510 and the conveyors 120 that are connected thereto due to shock loads, which could occur if the conveyors 120 were reversed at full speed.

At step 710, the controller 501 switches the direction of fluid within the system 500/600 by energizing the directional flow control valve 522 to move the valve 522 against the bias of a spring to the reverse state (not shown in FIG. 5). In the reverse state of the valve 522, the valve 522 directs the fluid from the valve 520 to the motor 510, and the valve 522 also directs the fluid from the motor 508 back to the reservoir 502. The reverse path of the fluid causes the motors 508 and 510 to rotate in a reverse direction, i.e., a direction that is opposite to the direction that the motors 508 and 510 normally rotate during the harvesting mode. At step 712, the controller 501 increases the flow of fluid to the draper motors 508 and 510 by adjusting the duty cycle of the proportional valve 520. At step 714, the pump 504 is operated at the increased speed established at step 712 for a pre-determined amount of time. The pre-determined amount of time may correspond to less than 250 mm of reverse rotational movement of the conveyors 120, for example. A sensor connected to the controller 501 may monitor movement of the motors 508 and 510, the conveyors 120 or a component connected thereto. Reversing rotation of the conveyors 120 causes any unwanted wedged, lodged or accumulated crop material to become dislodged from the conveyors 120. The system 500/600 is then ready to be returned to the harvesting mode.

At step 716, the controller 501 decreases the flow of fluid to the draper motors 508 and 510 by adjusting the duty cycle of the proportional valve 520, similar to step 708. At step 718, the controller 501 switches the direction of fluid within the system 500/600 by de-energizing the directional flow control valve 522 to return the valve 522 to the normal state that is shown in FIG. 5. In the normal state of the valve 522, the valve 522 freely permits the passage of fluid from the valve 520 and toward the motor 508, and also permits the passage of fluid from the motor 510 back to the reservoir 502. At step 720, the controller 501 increases the flow of fluid to the draper motors 508 and 510 by returning the duty cycle of the proportional valve 520 back to its level recorded at step 708, which is sufficient for harvesting crop, such that harvesting can continue indefinitely at step 722.

It is noted that steps 712, 714 and 716 are optional and may be omitted.

The method 700 may be completed during the headland mode, i.e., after the combine has completed harvesting one row in a crop field and is turning around to prepare to harvest the next row in the crop field. During this time, the header is lifted upwards in the air and is not operating in the harvest mode. The method 700 could be completed at every turn, every other turn, every tenth turn, or as needed. The method 700 may be repeated as many times as desired until the wedged, lodged or accumulated crop material becomes dislodged from the conveyors 120. The method 700 may also be completed as a precautionary measure.

The system 500/600 may include an emergency stop command that immediately stops all flow and returns the valves of the system 500/600 to their normal (harvest) state.

The system 500/600 and method 700 may vary from that which is shown and described. For example, the motor that rotates the infeed conveyor 126 may be incorporated into the system 500/600 by positioning that infeed conveyor motor in series and in fluid communication with the motors 508 and 510. Accordingly, performing the method 700 would also cause momentary reverse rotation of the infeed conveyor 126. Alternatively, a separate system may be provided for causing momentary reverse rotation of the infeed conveyor 126.

As another alternative to the system 500/600 and method 700 shown herein, the motors 508 and 510 could be separated into separate systems 500 such that the operator could individually control operation of the motors 508 and 510. In other words, one system 500/600 would control motor 508 and a separate system 500/600 would control motor 510. The two systems could share the same pump 504.

As yet another alternative to the system 500/600 and method 700 shown herein, an electric starter motor, solenoid or other motive device may be coupled to the motors 508 and 510 to cause momentary reverse rotation of the conveyor belts 120. As best shown in FIG. 5, an optional electric starter motor 540 may be connected to motor 510 to cause momentary reverse rotation of the conveyor belts 120. The optional electric starter motor 540 would be controlled by the controller 501. If the system 500 includes the optional electric starter motor 540, then the valve 522 (among other components of the system 500) may be omitted.

It is to be understood that the operational steps are performed by the controller 501 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 501 described herein is implemented in software code or instructions which are tangibly stored on a tangible computer readable medium. Upon loading and executing such software code or instructions by the controller 501, the controller 501 may perform any of the functionality of the controller 501 described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

In light of all the foregoing, it should thus be apparent to those skilled in the art that there has been shown and described a method and control system for reversing the direction of the laterally extending conveyors. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system for reversing a movement direction of a laterally extending conveyor of a draper header of an agricultural machine, said system comprising:
    a fluid line for delivering fluid to a motor that is configured to drive the laterally extending conveyor;
    a directional flow control valve connected to the fluid line and movable between a first state in which the directional flow control valve is configured to deliver the fluid to the motor in a first fluid direction to cause the motor to move the laterally extending conveyor in a first movement direction, and a second state in which the directional flow control valve is configured to deliver the fluid to the motor in a second fluid direction that is different from the first fluid direction to cause the motor to move the laterally extending conveyor in a second movement direction that is opposite to the first movement direction,
    wherein the directional flow control valve is maintained in the first state during a harvesting operation, and the directional flow control valve is maintained in the second state during an operation to dislodge crop material from the laterally extending conveyor;
    a flow control valve connected to the fluid line in series with the directional flow control valve for controlling a flow rate of the fluid moving downstream of the flow control valve; and
    a controller configured to adjust the flow control valve to reduce the flow rate of fluid delivered to the motor prior to switching the directional flow control valve to the second state.

2. The system of claim 1, wherein the controller is configured to maintain the directional flow control valve in the second state for a pre-determined amount of time before returning the directional flow control valve to the first state.

3. The system of claim 1, wherein the flow control valve and the directional flow control valve are biased to a normally open position.

4. The system of claim 1, wherein the controller is configured to energize the directional flow control valve and cause movement of the directional flow control valve to the second state.

5. The system of claim 4, wherein the controller is configured to energize the directional flow control valve and cause movement of the directional flow control valve to the second state for a pre-determined duration of time.

6. The system of claim 5, wherein the pre-determined duration of time corresponds to reverse movement of the laterally extending conveyor along the second movement direction.

7. The system of claim 1, further comprising the motor and second motor that is fluidly connected in series with said motor, and wherein said second motor is configured to drive a second laterally extending conveyor.

8. The system of claim 1 further comprising the laterally extending conveyor, wherein a direction of travel of the laterally extending conveyor is oriented substantially orthogonal to a direction of travel of an infeed conveyor of the draper header.

9. The system of claim 8, wherein a motor configured for moving the infeed conveyor does not form part of the system.

10. The system of claim 1, further comprising a pump connected to the fluid line for delivering fluid to the directional flow control valve.

11. The system of claim 1, further comprising:
    a pressure compensated fluid valve that is fluidly connected to the fluid line at a location between the flow control valve and the directional flow control valve; and
    a conduit connected to (i) said fluid line at a location between the flow control valve and the pressure compensated fluid valve, and (ii) an input of the pressure compensated fluid valve for communicating the fluid pressure in the fluid line to the pressure compensated fluid valve to set an open/closed position of the pressure compensated fluid valve.

12. A method of reversing a movement direction of a laterally extending conveyor of a draper header of an agricultural machine, said method comprising: delivering fluid through a fluid line to a motor in a first fluid direction such that the motor drives the laterally extending conveyor in a first movement direction during a harvesting operation, while a directional flow control valve connected to the fluid line is maintained in a first state,
- adjusting a flow control valve that is connected to the fluid line in series with the directional flow control valve to reduce a flow rate of fluid delivered to the motor via the fluid line; and
- switching the directional flow control valve to a second state to deliver the fluid to the motor in a second fluid direction that is different from the first fluid direction thereby causing the motor to move the laterally extending conveyor in a second movement direction that is opposite to the first movement direction for dislodging the crop material wedged in the laterally extending conveyor.

13. The method of claim 12, further comprising adjusting the flow control valve to increase the flow rate of the fluid through the fluid line following the switching step.

\* \* \* \* \*